(12) United States Patent
Taylor et al.

(10) Patent No.: US 11,556,133 B2
(45) Date of Patent: Jan. 17, 2023

(54) INTER-VEHICLE COLLABORATION TO MODIFY A PARKING QUEUE

(71) Applicant: International Business Machines Corporation, Armonk, NY (US)

(72) Inventors: Paul Taylor, Eastleigh (GB); Gary Stuart Bettesworth, Baskingstoke (GB); Daniel Del Piccolo, Southsea (GB); Matthew John Comer, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 16/523,426

(22) Filed: Jul. 26, 2019

(65) Prior Publication Data
US 2021/0026370 A1  Jan. 28, 2021

(51) Int. Cl.
*G05D 1/02* (2020.01)
*G05D 1/00* (2006.01)
(Continued)

(52) U.S. Cl.
CPC ......... *G05D 1/0287* (2013.01); *G05D 1/0088* (2013.01); *G05D 1/0214* (2013.01);
(Continued)

(58) Field of Classification Search
CPC .. G05D 1/0287; G05D 1/0088; G05D 1/0214; G05D 2201/0213; G08G 1/161;
(Continued)

(56) References Cited

U.S. PATENT DOCUMENTS 6,285,297 B1  9/2001  Ball
6,426,708 B1  7/2002  Trajkovic
(Continued)

OTHER PUBLICATIONS

"Community-based Parking: helping on another find the nearest available parking space more quickly", Copyright 2018 Robert Bosch GmbH, Bosch, https://bosch-mobility-solutions.com/en/products-and-services/mobility-services/connected-parking/community-based-parking/.
(Continued)

*Primary Examiner* — Abby Y Lin
*Assistant Examiner* — Dylan M Katz
(74) *Attorney, Agent, or Firm* — Stephanie L. Carusillo

(57) ABSTRACT

A method for modifying a queue of vehicles. In one embodiment, the method includes at least one computer processor determining respective distance values between a first vehicle and one or more adjacent vehicles within a queue of vehicles. The method further includes determining a threshold distance value that corresponds to a distance required to extract the first vehicle from within the queue of vehicles. The method further includes determining a change of position corresponding to at least one adjacent vehicle to the first vehicle within the queue of vehicles based on the determined respective distance values, wherein the determined change in position moves the at least one adjacent vehicle to a distance value from the first vehicle that exceed the threshold distance value. The method further includes transmitting respective requests to the at least one adjacent vehicle to move to the determined change of position.

20 Claims, 4 Drawing Sheets

(51) Int. Cl.
*G08G 1/16* (2006.01)
*B62D 15/02* (2006.01)

(52) U.S. Cl.
CPC . *B62D 15/0285* (2013.01); *G05D 2201/0213* (2013.01); *G08G 1/161* (2013.01)

(58) Field of Classification Search
CPC .... G08G 1/22; B60W 2556/65; B60W 30/06; B60W 2050/048; B62D 15/0285
See application file for complete search history.

(56) References Cited

U.S. PATENT DOCUMENTS

| | | |
|---|---|---|
| 6,819,321 B1 | 11/2004 | Hsieh |
| 9,449,512 B2 | 9/2016 | Zafiroglu |
| 2007/0282489 A1* | 12/2007 | Boss .................. B62D 15/0285 701/2 |
| 2014/0372185 A1 | 12/2014 | Ganot |
| 2015/0279210 A1* | 10/2015 | Zafiroglu ............... G08G 1/143 340/932.2 |
| 2016/0267794 A1* | 9/2016 | Cogill ..................... G08G 1/144 |
| 2017/0212511 A1 | 7/2017 | Paiva Ferreira |
| 2018/0307248 A1 | 10/2018 | Harvey |
| 2018/0334163 A1* | 11/2018 | Beauvais ........... B62D 15/0285 |
| 2019/0113933 A1* | 4/2019 | Ha ..................... B62D 15/0285 |
| 2021/0024055 A1* | 1/2021 | Yang ...................... G08G 1/168 |

OTHER PUBLICATIONS

Aliedani et al., "Investigating vehicle-to-vehicle communication for cooperative car parking: The CoPark approach", 2016 IEEE International Smart Cities Conference (ISC2), Date of Conference: Sep. 12-15, 2016, IEEE, 9 pps., https://ieeexplore.ieee.org/document/7580732/?reload=true.

Correa et al., "Autonomous Car Parking System through a Cooperative Vehicular Positioning Network", Sensors 17 (4), Apr. 2017, 18 pps., https://www.researchgate.net/publication/316944940_Autonomous_Car_Parking_System_through_a_Cooperative_Vehicular_Positioning_Network/link/5a319b3faca2727144a1c8ad/download.

Lin et al., "A Survey of Smart Parking Solutions" IEEE Transactions on Intelligent Transporlalion Systems 18(12):3229-3253, Apr. 2017, https://www.researchgate.net/publication/316080419_A_Survey_of_Smart_Parking_Solutions.

Ferreira, et al., "Self-automated parking lots for autonomous vehicles based on vehicular ad hoc networking", Conference Paper, Jun. 2012, Uploaded on Jun. 17, 2014, ResearchGate, 9 pps.

* cited by examiner

INTER-VEHICLE COLLABORATION TO MODIFY A PARKING QUEUE

BACKGROUND OF THE INVENTION

The present invention relates generally to the field of vehicle automation, and more particularly to modifying the respective positions of vehicles within a queue of vehicles.

On-street parking near town centers often includes pre-marked parking spaces along streets; whereas residential streets lack specific parking space designation but both types of parking locations usually are linear arrangements of vehicles. Parking areas may also include zones based on various restrictions, such as around fire-hydrants; at crosswalks; or within a specified distance of a structure, such as building or a cross-street. Technology has advanced, and vehicles have been automated to varying degrees, such as assisted-driving features, semi-autonomous vehicles, and fully autonomous vehicles. Thus, based on the features within an automated vehicle and vehicle-to-vehicle communications, a vehicle can self-park with minimal intervention from a driver. However, some drivers may elect to park a vehicle based on the skill and observations of the driver of the vehicle.

SUMMARY

According to aspects of the present invention, there is a method, computer program product, and/or system for modifying a queue of vehicles. In an embodiment, the method includes at least one computer processor determining respective distance values between a first vehicle and one or more adjacent vehicles within a queue of vehicles. The method further includes at least one computer processor determining a threshold distance value that corresponds to a distance required to extract the first vehicle from within the queue of vehicles. The method further at least one computer processor includes determining a change of position corresponding to at least one adjacent vehicle to the first vehicle within the queue of vehicles based on the determined respective distance values, wherein the determined change in position moves the at least one adjacent vehicle to a distance value from the first vehicle that exceed the threshold distance value. The method further includes at least one computer processor transmitting respective requests to the at least one adjacent vehicle to move to the determined change of position.

DETAILED DESCRIPTION

Figure 1:
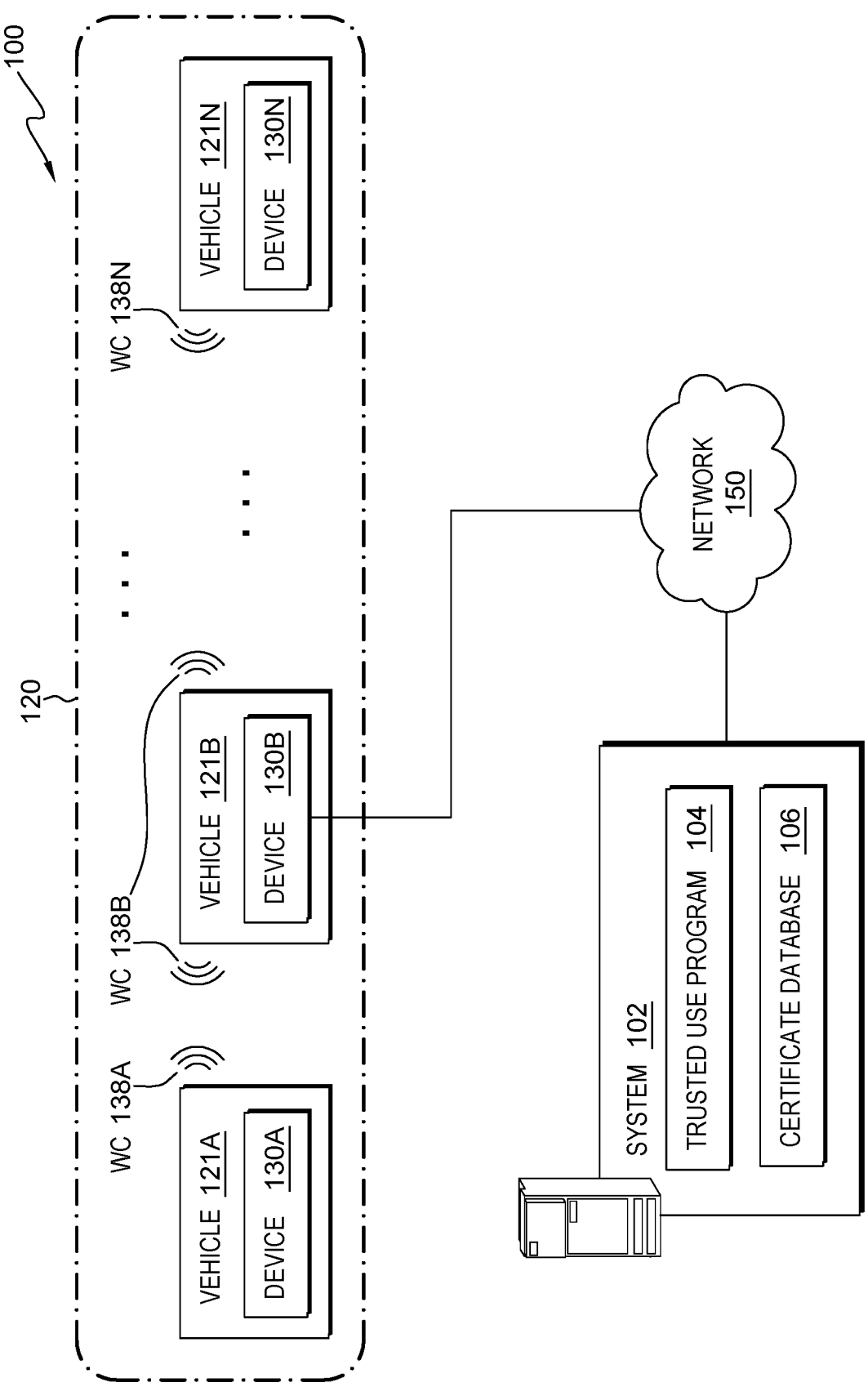
FIG. 1 illustrates a parking queue environment, in accordance with an embodiment of the present invention.

Embodiments of the present invention recognize that on-street parking near town centers or on residential streets can suffer from congestion, due to the shortage of parking spaces. Furthermore, poor parking or inconsiderate parking etiquette exacerbates the problem. Vehicle owners that park vehicles illegally or that park too close to other vehicles effectively block a vehicle from exiting a line of vehicles because sufficient space is lacking to safely exit the line (e.g., a queue) of vehicles. Similarly, poor parking among vehicles within a queue of vehicles can block an egress point, external to the line of parked vehicles, such as a driveway, that another vehicle cannot traverse to access a thoroughfare, which passes along side of the queue of vehicles. Further, if a vehicle is illegally parked, it may difficult to extract or tow the illegally parked vehicle without damaging the vehicle and/or adjacent vehicles if sufficient space is lacking between the illegally parked vehicle and adjacent vehicles. As used to herein, a queue of vehicles refers to a linear arrangement of vehicles, where the vehicles are generally oriented along the long axis (i.e., length) of the vehicles.

Embodiments of the present invention recognize that vehicle automation is continually evolving. While fully autonomous driving vehicles are still in development for public use, some vehicle features that have been automated and approved for use by the public, such as remote-activation (e.g., self-starting), collision avoidance, dynamic cruise-control, and self-parking. Autonomous vehicles, semi-autonomous vehicles, and/or driving-assisted vehicles are hereinafter referred to as automated vehicles. However, embodiments of the current invention also recognize that some drivers may manually park automated vehicles within a queue of vehicles such as along a street and may not optimally position some vehicles within the queue; thereby "parking in" (e.g., blocking) a vehicle rendering the exit or extraction of the vehicle from with the queue difficult or impossible.

Embodiments of the current invention further recognize a related situation associated with the non-optimal distributions of vehicles within a queue, difficulties adding a vehicle to the queue. The situation where queue of vehicles includes large spaces (e.g., gaps) distributed among the vehicles within the queue, but lacking a space large enough (e.g., greater than a threshold size) for another vehicle; thereby excluding the other vehicle from parking (e.g., being inserted) within the queue and resulting in the unoptimized use of the available parking space.

Embodiments of the present invention respond to a command signaling to vacate (e.g., exit) a parking space by: a computing system included within a vehicle; an occupant of a vehicle, via an interface included in the vehicle or a mobile device application; or an after-market device. Embodiments of the present invention signals (e.g., requests) to one or more automated vehicle within the queue of vehicles to remotely-activate and to modify respective vehicle positions within the queue, without human intervention to allow the vehicle to vacate the queue. Embodiments of the present invention utilize wireless inter-vehicle communications to propagate or relay the request to modify the positions of vehicles within the queue beyond the range of the vehicle that initiates the request without requiring intervention by a central authority and/or via accessing the Internet. Embodiments of the present invention utilize the inter-vehicle communications to dynamically map the locations of various vehicles within the queue as opposed to only the vehicles adjacent to the vehicle signaling to exit the queue of vehicles.

Some embodiments of the present invention enable a vehicle blocked by one or more vehicles within the queue to pass through the queue, such as signaling to unblock a driveway to provide access to a street. Various embodiments of the present invention can redistribute (e.g., recalculate) positions of vehicles located within the queue to correct issues related to vehicles within the queue, such as intruding or encroaching on restricted zones or restricted areas (e.g., based on an ordinance, based on a legal constraint), and/or leaving sufficient space for another vehicle to potentially park (e.g., be inserted) within the queue. Examples of restricted zones or restricted areas include, but are not limited to an area by a fire hydrant, a crosswalk, a driveway, another street, an exclusion area prior to another street, a no-parking area, etc. Each type of restricted area may be associated with a size, such as a length and a width, and may include further constraints that affect the portion of the restricted area that is utilized. In an example, a driveway may not include area encroachment constraint. However, the area in front of a fire-hydrant must be clear for at least two feet on either side in front of the fire hydrant. Similarly, a restricted area (e.g., a no parking zone) beyond an end of the queue of vehicles prior to a cross street may dictated an encroachment limitation of eight feet from the corner of the streets to prevent line-of-sight or turning radius issues for traffic.

Other embodiments of the present invention utilize trusted entity and/or digital certificate information to authorize and dictated movement among vehicles within the queue, such as by a law enforcement entity tagging a vehicle that is "parked in" with a device to enable the vehicle to be towed; or to provide emergency personnel access to a blocked resource, such as a fire hydrant or a crosswalk. Further embodiments of the present invention can compensate for vehicles that include one or more physical elements that extend beyond the size specifications (e.g., length, width, height) associated with the vehicle, such as after-market bumpers, trailer hitches, bicycle racks, storage racks, and/or attached trailers.

Alternative aspects of various embodiments of the present invention enable a vehicle that approaches a queue of vehicles to signal the queue of vehicles to modifying respective positions of one or more vehicles within the queue to allow the vehicle external to the queue to park (e.g., be inserted) within the queue. In addition, embodiments of the present invention are applicable to automated vehicles that are utilized by other users or parked within other queues, such as a rental company, a vehicle-sharing service, or are automated fleet vehicles.

The present invention will now be described in detail with reference to the Figures. FIG. 1 is a functional block diagram illustrating parking queue environment 100 in an embodiment, in accordance with the present invention. In an embodiment, parking queue environment 100 includes: system 102 and queue 120 (i.e., a queue of vehicles). Queue 120 includes a plurality of vehicles, such as, vehicle 121A and 121B through vehicle 121N. In an embodiment, vehicle 121B and a corresponding instance of a computing device (i.e., device 130B) are interconnected with system 102 over network 150. In some embodiments, one or more other vehicles within queue 120 are also interconnected with system 102 over network 150. In various embodiments, parking queue environment 100 includes a user and a corresponding mobile device (not shown) that includes one or more aspects of device 130, such as queue control program 300 (discussed in further detail with respect to FIG. 2). FIG. 1 provides only an illustration of one implementation and does not imply any limitations with regard to the systems and environments in which different embodiments may be implemented. Many modifications to the depicted environment may be made by those skilled in the art without departing from the scope of the invention as recited by the claims.

System 102 and device 130A, device 130B through device 130N may be: laptop computers, tablet computers, netbook computers, personal computers (PC), desktop computers, personal digital assistants (PDA), smart phones, wearable devices (e.g., digital eyeglasses, smart glasses, smart watches, smart televisions, etc.), or any programmable computer systems known in the art. In certain embodiments, system 102 represents computer systems utilizing clustered computers and components (e.g., database server computers, application server computers, etc.) that act as a single pool of seamless resources when accessed through network 150, as is common in data centers and with cloud-computing applications.

In various embodiments, device 130A, device 130B and device 130N are representative of one or more computing systems (e.g., an onboard computers, other programmable electronic devices, or sub-systems) included within respective vehicles of queue 120, such as of vehicle 121A, vehicle 121B, and vehicle 121N. In general, system 102 is representative of any programmable electronic device or combination of programmable electronic devices capable of executing machine-readable program instructions and wirelessly communicating with one or more within computing devices within a vehicles include with queue 120, such as device 130B of vehicle 121B. System 102 may include components, as depicted and described in further detail with respect to FIG. 4, in accordance with embodiments of the present invention.

In an embodiment, system 102 is representative of a computing system associated with one or more trusted entities and generates digital certificates that are utilized to secure aspects of the current invention from malicious activities. System 102 includes: trusted use program 104, certificate database 106, and various programs and/or databases (not shown), such as but not limited to: an operating system, a file management program, a database management system, various Internet applications, a user interface, etc., utilized by system 102. In various embodiments, system 102 utilizes network 150 to transmit digital certificates from certificate database 106 to: an instance of a computing device included within a vehicle within queue 120, such as device 130B of vehicle 121B. In other embodiments, system 102 utilizes network 150 to transmit one or more digital certificates from certificate database 106 to a mobile device (not shown) of an individual, such as, a law enforcement agent, a firs-responder, a driver of a vehicle within queue 120, etc.; an after-market device (not shown) external to or separate from a vehicle within queue 120; and/or a vehicle external to queue 120.

Figure 2:
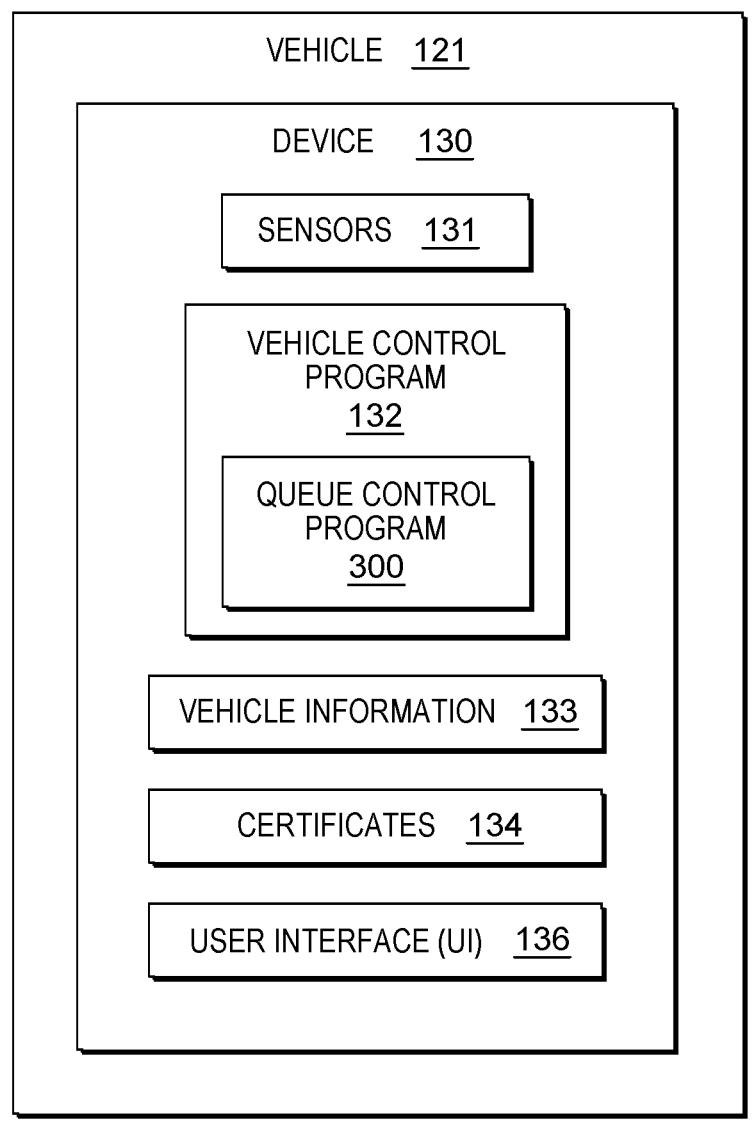
FIG. 2 is a block diagram illustrating an example subset of features associated with an automated vehicle, in accordance with an embodiment of the present invention.
Figure 3:
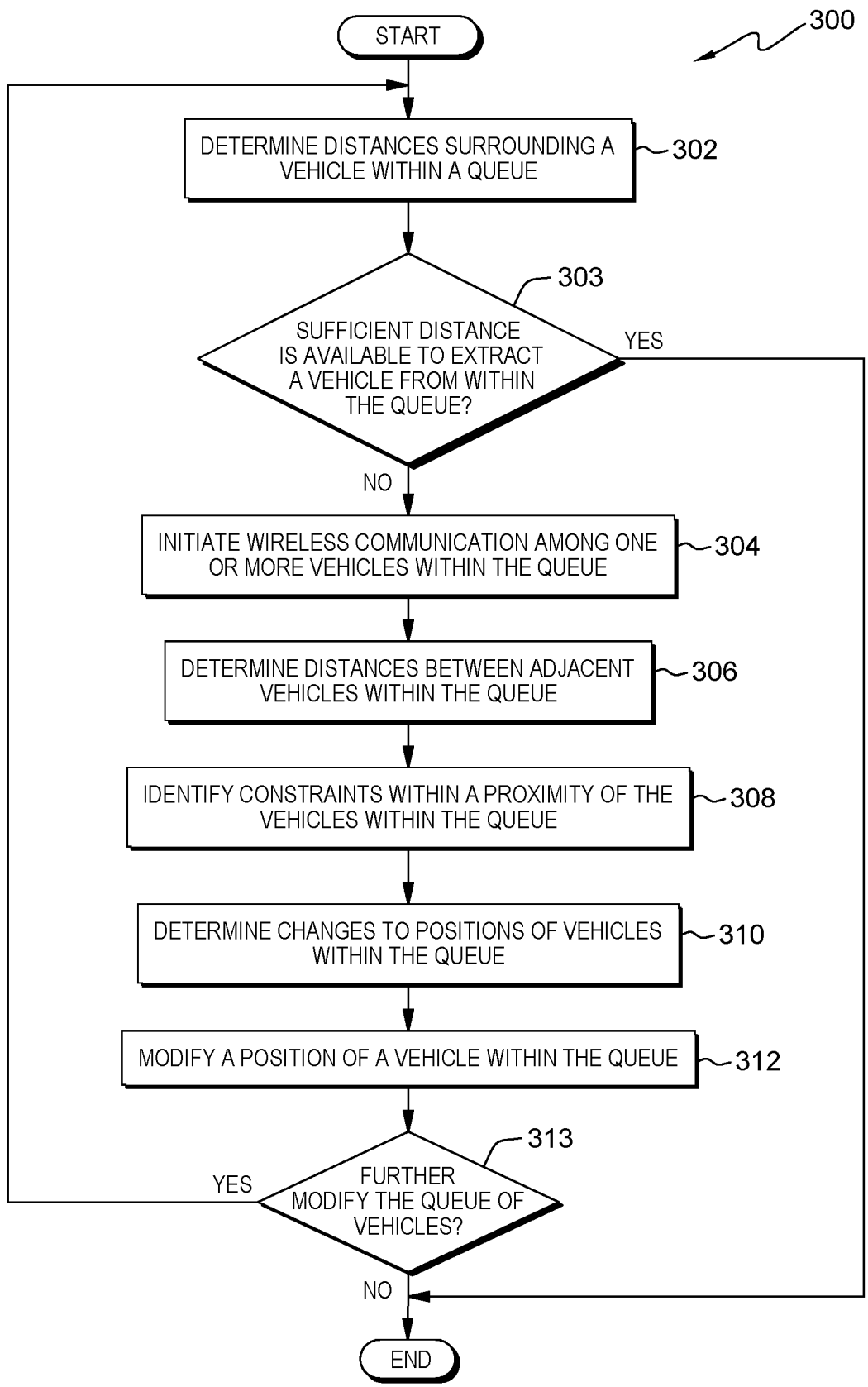
FIG. 3 depicts a flowchart of the operational steps of a vehicle management program, in accordance with an embodiment of the present invention.

Trusted use program 104 is a program that generates digital certificates (e.g., enabling vehicle control program 132 and/or queue control program 300 to securely operate, discussed in further detail with regard to FIG. 2 and FIG. 3). In addition, trusted use program 104 maintains and controls access to certificate database 106. In various embodiments, trusted use program 104 stores copies of digital certificates (e.g., instances certificates 134) within certificate database 106. In one embodiment, trusted use program 104 is associated with a group or organization of businesses, such as vehicle manufacturers that have agreed upon a set of protocols or security measures related to vehicle-to-vehicle communications and/or automated vehicle control programs (e.g., vehicle control program 132 and/or queue control program 300, discussed in further detail with respect to FIG. 2).

In another embodiment, trusted use program 104 is a service that various law enforcement agencies, first-responders (i.e., emergency personnel), state/local authorities, and/or authorized utility workers can access to obtain copies of digital certificates for vehicles and/or generate temporary digital certificates for vehicles to authorize various vehicle control programs, such as queue control program 300 to interface with one or more vehicles. In an example, law enforcement may request to create a digital certificate for a given vehicle ID and with a specified expiration duration. In another example, first-responders obtain authority from trusted use program 104 to obtain a set of copies certificates corresponding to a set of vehicles included within queue 120 to invoke an instance of queue control program 300.

In an embodiment, queue 120 is representative of an area to temporarily store a plurality of vehicles while occupants and/or a driver of a vehicle are within another location, such as a business, a residence, a government building, etc. Queue 120 includes a plurality of parking spaces (e.g., storage locations) for vehicles. Examples of types of vehicle queues may include on-street parking spaces; designated pickup/drop-off zones, such as at a school or airport; parking at a scenic vantage point; etc. An example of another type of vehicle queue associated with a different type of vehicle includes berths at a dock for boats.

In some embodiments, queue 120 includes a plurality of wireless communications (WCs) among various elements of parking queue environment 100, such as vehicle to vehicle communications, mobile device (not shown) to vehicle communications, after-market device (not shown) to vehicle communications, etc. An example of vehicle to vehicle communications is represented by WC 138A and WC 138B respectively associated with device 130A, device 130B included within respective vehicle 121A and vehicle 121B. In an embodiment, the wireless communications within queue 120 (e.g., WC 138A, WC 138B, and WC 138N) are representative of various types of wireless connections and communication protocols described in further detail with respect to network 150.

In various scenarios, a signal strength corresponding to a wireless communication, limits range within which a vehicle included within queue 120 can interface and respond to commands issued by another vehicle. In various embodiments, some information and commands are relayed or "ripple communicated" among computing devices included within vehicles of queue 120 to extend the range of aspects of the present invention. For example, device 130A may lack the signal strength to transmit information, commands, and/or requests to device 130N of vehicle 121N; therefore, device 130A may request that device 130B to relay information, commands, and/or requests included in WC 138A to at least vehicle 121C (not shown) utilizing WC 138B for eventual receipt by device 130N of vehicle 121N.

Network 150 can be, for example, a local area network (LAN), a telecommunications network, a wireless local area network (WLAN), such as an intranet, a wide area network (WAN), such as the Internet, or any combination of the previous and can include wired, wireless, or fiber optic connections. In general, network 150 can be any combination of connections and protocols that will support communications between system 102 and one or more instances of device 130, included in a respective instance of vehicle 121 and/or separate from an instance of vehicle 121, in accordance with embodiments of the present invention. In various embodiments, network 150 operates locally via wired, wireless, or optical connections and can be any combination of connections and protocols (e.g., personal area network (PAN), near field communication (NFC), Bluetooth™, laser, infrared, ultrasonic, etc.).

Vehicle 121A, vehicle 121B through vehicle 121N are representative of a plurality of vehicles. In one embodiment, vehicle 121A through vehicle 121N can include a combination of autonomous vehicles, semi-autonomous vehicles, automated vehicles that include one or more driving-assist features (e.g., self-parking, remote-activation, collision avoidance, etc.), and non-automated vehicles. In some embodiments, one or more of vehicle 121A through vehicle 121N are manually-operated vehicles. In various embodiments, the term "vehicle" should be construed having a broad meaning and should include all types of vehicles. Non-limiting examples of types of vehicles include: passenger cars, trucks, all-terrain vehicles, public transportation vehicles, unmanned vehicles, recreational vehicles, construction vehicles, trains, and/or boats.

In one embodiment, FIG. 2 is an illustrative block diagram of an instance of a portion of vehicle 121, in accordance with embodiments of the present invention. An instance of vehicle 121 may include but is not limited to a locomotion enabling mechanism (e.g., a powertrain, a drivetrain, etc.), a braking system, controls and instrumentation, and a steering system (not shown). The instance of vehicle 121 may also include a plurality of other physical, mechanical, electrical, and/or computerized features (not shown) that may be utilized to practice and/or affect the operations of various embodiments of the present invention. Instances of vehicle 121 and included device 130 may include components, as depicted and described in further detail with respect to FIG. 4, in accordance with embodiments of the present invention.

In an embodiment, vehicle 121 is representative of at least vehicle 121A, vehicle 121B, and vehicle 121N of parking queue environment 100. In some embodiments, autonomous, semi-autonomous, and/or driving-assisted versions of vehicle 121 include an instance of device 130 that further includes other components and functions such as, sensors 131, vehicle control program 132, vehicle information 133, certificates 134, user interface (UI) 136, and other elements and subsystems (not shown) associated with the instance of vehicle 121. In an example, UI 136 may be included in a human/machine interface that is embedded within a console (not shown) of an instance of vehicle 121 and generated by an instance of device 130.

In other embodiments, vehicle 121 is representative of an electronically-enhanced, manually driven vehicle that includes a subset of features of device 130, such as sensors 131, queue control program 300, vehicle information 133, certificates 134, and user interface (UI) 136. Device 130 may use one or more sensors of sensors 131 to determine distance surrounding the instance of vehicle 121 and issue proximity or hazard warnings.

Device 130 also includes one or more communications systems (not shown) that generate instances of WC 130 that can interface device 130 with other entities external to an instance vehicle 121. In one embodiment, device 130 is representative of an on-board computer and/or one or more sub-systems of an instance of vehicle 121. In general, instances of device 130 are representative of any programmable electronic device or combination of programmable electronic devices capable of executing machine-readable program instructions and wirelessly communicating with one or more vehicles and/or other electronic devices (not shown) within queue 120. Respective instances device 130 included within queue 120 such as at least device 130A, device 130B and device 130N may include components, as depicted and described in further detail with respect to FIG. 4, in accordance with embodiments of the present invention.

Sensors 131 includes one or more sensors or systems, such as a computer vision system, Light Detection and Ranging (LIDAR) system, a radar system, ultrasonic distance sensors, infra-red distance sensors, an inertial measurement unit (IMU), a dead-reckoning system, wheel speed sensors, a global navigation satellite system (GPS), cameras, etc.

Vehicle control program 132 is a program that controls an automated instance of vehicle 121, processes data one or more sensors of sensors 131, and includes an instance of queue control program 300. Vehicle control program 132 controls automated-driving or driving-assist features, such as remote-activation, self-parking, auto-navigation, collision avoidance, etc. In an embodiment, in response to a driver of an instance of vehicle 121 activating vehicle control program 132, queue control program 300 can automatically activate as a sub-function of vehicle control program 132. In various embodiments, vehicle control program 132 requires receipt of a digital certificate to authorize an external program, such as a different instance of queue control program 300 to issue commands to the internal instance of vehicle control program 132.

Queue control program 300 is a program that determines whether to modify the positions of one or more vehicles within a queue of vehicles based on the spaces (e.g., distances) between vehicles within the queue. In one embodiment, queue control program 300 modifies the positions of vehicles within a queue to enable a vehicle within the queue to exit the queue. In another embodiment, queue control program 300 modifies the positions of vehicles within a queue to enable a vehicle to traverse through the queue of vehicles. In a further embodiment, queue control program 300 modifies the positions of vehicles within a queue to enable a vehicle external to the queue to be added, inserted, or parked within the queue of vehicles.

In some embodiments, queue control program 300 is included within an instance of device 130, which is included in an instance of vehicle 121, such as a software feature included within a new vehicle or an upgrade to vehicle control program 132. In other embodiments, a version of queue control program 300 is an application installed within a mobile device of a user (e.g., driver). The mobile application version of queue control program 300 can be utilized with an instance of vehicle 121 that is manually driven, or with an instance of vehicle 121 that includes an instance of device 130 and/or vehicle control program 132 that cannot be updated to include an instance of queue control program 300. The mobile application version of queue control program 300 may dictated that vehicle information 133 be loaded to the mobile device of the user or manually entered to the mobile device of the user. Certificates 134 authorizing queue control program 300 to interact with instances of vehicle control program 132 and/or other instances of queue control program 300 included in other vehicles within a queue of vehicles can be acquired from system 102 and downloaded to the mobile device of the user.

In some scenarios, a plurality of other instances of queue control program 300 and/or vehicle control program 132 respectively associated with the other instances of vehicle 121 within queue 120 are controlled by a master instance of queue control program 300 within the instance of vehicle 121 trying to exit, traverse, or add to queue 120. In other scenarios, the plurality of instances of queue control program 300 respectively associated with the instances of vehicle 121 within queue 120 interact and operate collaboratively.

In an alternative embodiment, queue control program 300 can be included in an after-market device that can be purchased by an owner of a vehicle, an owner of a plurality of vehicles (e.g., fleet vehicles, rental vehicles, etc.), and/or trusted authorities; and also includes certificates 134, and wireless communication capabilities. Trusted authorities may include such as law enforcement, tow-truck operators, emergency personnel, etc. In one example, queue control program 300 dictates to modify the positions of vehicles within a queue to minimize the possibility of damaging one or more vehicles within the queue while extracting a vehicle from the queue that is illegally parked. In another example, queue control program 300 dictates to modify the positions (e.g., locations) of vehicles within queue 120 to create/modify a space around or within a queue of vehicles to improve access for emergency personnel, such as firemen, paramedics, utility workers, etc., to various infrastructure elements (e.g., a manhole cover, utility shutoffs, storm drains, power vaults, etc.) in or around the queue.

In one embodiment, vehicle information 133 includes a unique identifier (ID) corresponding to a vehicle; information associated with a vehicle, such as vehicle specification; one or more security codes to access one or more functions of the vehicle; commands and controls for remote-activation, self-driving, navigation, and assisted-parking; and/or information input by a user of the vehicle. Specifications corresponding to a vehicle may include a size of the vehicle (e.g., length, width, height, etc.), a turning radius of the vehicle, and/or features included within the vehicle). In an example, features included within an instance of vehicle 121 may include cameras, warning indicators, elements that affect the movement capabilities of the vehicle, etc. In some embodiments, vehicle information 133 includes information related to accessories (e.g., physical elements) of and/or attached to and/or producing from the vehicle, such as dimensions (e.g., size values) related to extended side-view mirrors, a luggage rack, a bicycle rack, an ancillary transport unit (e.g., a trailer) coupled to the vehicle, etc.

Capabilities of an instance of vehicle 121 may include auto-starting, auto-parking, self-driving, control interfaces, etc. Vehicle information 133 may also include information associated with one or more drivers of the vehicle, such as a skill level (e.g., novice, average, advanced, etc.) associated with a driver of the vehicle and/or limitations associated with a driver, such as a sight or range of motion limitation.

Certificates 134 are digital security certificates that enable queue control program 300 to operate securely and prevent malicious activities from affecting queue control program 300. Instanced of certificates 134 are obtained from system 102 utilizing trusted use program 104. In response to requesting an instance of certificates 134, trusted use program 104 enables the authorized and secure handling of user information, such as tracking information, as well as types and categories of information that may have been obtained, are maintained, and/or are accessible. Some user information that is controlled (e.g., consent based) is included within an instance of certificates 134. Other user information that is controlled (e.g., consent based) is stored within system 102. The user can be provided with notice of the collection of types and categories of information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

An instance of certificates 134 may be specific to a vehicle and associated with the ID of the vehicle to prevent copying and unauthorized use. In an embodiment, certificates 134 are volatile and expire after a fixed period of time and/or event. For example, a law enforcement officer tags an illegally parked vehicle within queue 120, such as vehicle 121H, with an after-market device that includes queue control program 300 and obtains an instance of certificates 134 dictated for vehicle 121H. If the tow-truck operator does not arrive to extract vehicle 121H within a period of time present assigned to the obtained instance of certificates 134, then queue control program 300 does not execute. Similarly, if the tow-truck operator attempts to extract a vehicle from queue 120 different from vehicle 121H, then queue control program 300 does not execute. Alternatively, in response to successfully extracting vehicle 121H from queue 120, the obtained instance of certificates 134 expires. However, active instances of certificates 134 and queue control program 300 within vehicles that remain within queue 120 may be utilized to recalculate one or more vehicle locations (e.g., positions) and reposition the one or more vehicles within queue 120 after a vehicle exits, is extracted, traverses, or is added to queue 120.

In one embodiment, UI 136 may be a graphical user interface (GUI) or a web user interface (WUI). UI 136 can display text, documents, forms, web browser windows, user options, application interfaces, and instructions for operation, and include the information, such as graphic, text, and sound that a program presents to a user. In various embodiments, UI 136 displays one or more icons representing applications that a user can execute in association with an instance of vehicle 121 and/or device 130. In addition, UI 136 can control sequences of actions that the user utilizes to respond and/or confirm actions associated with queue control program 300. In another embodiment, an instance of UI 136 is representative of the application interface of queue control program 300 executing within a mobile device (not shown) of the user of an instance of vehicle 121.

In an alternative embodiment, an instance of UI 136 is representative of the application interface of queue control program 300 executing within or interfacing with an after-market device (not shown) that includes an instance of queue control program 300. In some scenarios, UI 136 is generated on an interface included in the after-market device. In other scenarios, UI 136 is generated within a console or mobile device of a trusted authority that enables wireless communication between the console or mobile device and the instance of queue control program 300 executing within the aftermarket device.

In some embodiments, a user of device 130 can interact with UI 136 via a singular device, such as a touch screen (e.g., display) that performs both input to a GUI/WUI, and as an output device (e.g., a display) presenting a plurality of icons associated with apps and/or images depicting one or more executing software applications. In other embodiments, a software program (e.g., a web browser) can generate UI 136 operating within the GUI environment of device 130. UI 136 accepts input from a plurality of input/ output (I/O) devices (not shown) including, but not limited to, a tactile sensor interface (e.g., a touch screen, a touchpad), a virtual interface device, and/or a natural user interface (e.g., voice control unit, motion capture device, eye tracking, cyberglove, heads-up display, etc.). In addition to the audio and visual interactions, UI 136 may receive input in response to a user of device 130 utilizing natural language, such as written words or spoken words, that device 130 identifies as information and/or commands.

FIG. 3 is a flowchart depicting operational steps for queue control program 300, a program that modifies the positions of vehicles, within a queue of vehicles, to enable a vehicle within the queue to exit the queue, in accordance with embodiments of the present invention. In various embodiments, queue control program 300 interfaces with various elements and functions of an instance of device 130 to: determine one or more distance values respectively associated with one or more vehicles within queue 120, initiate wireless communications among two or more vehicles within queue 120, and request (e.g., command) one or more vehicles within queue to modify respective positions within queue 120. Alternatively, and/or in addition to, queue control program 300 can modify the positions of vehicles, within a queue of vehicles, to enable a vehicle external to the queue to pass through the queue of vehicles or be added to the queue, in accordance with embodiments of the present invention.

In one embodiment, queue control program 300 is a feature integrated within the command and control software of an automated vehicle and activates in response to activating (e.g., starting) the vehicle. In another embodiment, queue control program 300 can pre-emptively activate based on various learned factors associated with a user (e.g., a driver) of a vehicle, such as remotely unlocking the vehicle at particular times of a day; or a combination of sensor inputs, such as detecting that the driver's seat is occupied, and mirrors are being adjusted. In some embodiments, queue control program 300 is a software application that an occupant and/or driver of a vehicle (e.g., automated or manually-operated) initiates via a mobile device. In other embodiments, queue control program 300 is a feature integrated within an after-market electronic device utilized by a user of a vehicle or a trusted authority, such as a law enforcement officer, emergency personnel, etc., that need to affect one or more vehicles within a queue.

In step 302, queue control program 300 determines distances surrounding a vehicle within a queue. In an example, queue control program 300 may utilize one or more of sensors of sensors 131 included within device 130B of vehicle 121B, to determines a set of distances values surrounding vehicle 121B. In one embodiment, queue control program 300 determines distance values surrounding a vehicle within queue 120, such as the size of spaces ahead and behind the vehicle within the queue. In another embodiment, queue control program 300 determines distance values between two instances of vehicles 121 within queue 120, such as vehicle 121A and vehicle 121B; for a vehicle (not shown) that is external to queue 120 and the vehicle must traverse (e.g., pass through) queue 120 to access an area beyond queue 120, such as a street.

In various embodiments, queue control program 300 determines one or more distance values to a respective objects, such as a utility pole within a proximity to (e.g., along a side, by a corner) of the vehicle within queue 120. Subsequently, queue control program 300 determines whether one or more objects reduce an area of movement related to the vehicle. Queue control program 300 can modify one or more distance values surrounding the vehicle to compensate for a set of dimensions (e.g., size values), included within a corresponding instance of vehicle information 133, which correspond to one or more physical elements associated with a vehicle that extend beyond the specifications of the vehicle.

Still referring to step 302, in other embodiments, if queue control program 300 cannot determine one or more distance values associated with a vehicle attempting to exit, traverse, or be added to queue 120, then queue control program 300 skips decision step 303 and initiates wireless communication with one or more other vehicles within queue 120 (step 304) to obtain one or more distance value determinations (step 306). Additionally, queue control program 300 may also identify constraints within a proximity of the vehicles within queue 120 (in step 308). In response, queue control program 300 receives wirelessly communicated distance information determined by one or more vehicles within queue 120. For example, vehicle 121B includes an attached trailer (not shown). Vehicle 121B can determine the distance to vehicle 121A. However, since the trailer attached to vehicle 121B does not include an instance of sensors 131, vehicle 121B cannot determine a distance to vehicle 121C (not shown). Therefore, queue control program 300 initiates WC 138B that requests (e.g., commands) device 130C (not shown) of vehicle 121C to determine the distance value between the end of the attached trailer attached to vehicle 121B and vehicle 121C.

In a further embodiment, if a vehicle (not shown) external to queue 120 utilizes queue control program 300 to add, insert, or park a vehicle within queue 120, then queue control program 300 skips decision step 303 and executes steps 304, 306, and 308 to determine whether the queue includes sufficient space to add the vehicle to queue 120. Responsive to queue control program 300 determining that queue 120 include sufficient space to add the vehicle within queue 120, then queue control program 300 notifies a message to the user of the vehicle via UI 136 indicating that the vehicle can be added to queue 120. Alternatively, if queue control program 300 determines that queue 120 does not include sufficient space to add the vehicle within queue 120, then queue control program 300 notifies a message to the user of the vehicle via UI 136 that the vehicle cannot be added to queue 120, and queue control program 300 terminates.

In one embodiment, in decision step 303, queue control program 300 determines (e.g., calculates) whether sufficient distance is available to extract a vehicle from within a queue. In some embodiments, steps 304, 306, and 308 execute concurrently with decision step 303. Steps 304, 306, and 308 are utilized to determine whether the queue includes sufficient space among other portions of queue 120 in combination with the distance values surrounding the vehicle are sufficient to extract the vehicle form within queue 120.

In one scenario, queue control program 300 utilizes the distance values surrounding a vehicle, determined by device 130 of the vehicle and information within vehicle information 133, such as a turning radius and sizes related to accessories to determine whether sufficient distance is available to extract a vehicle from within a queue. In other scenarios, queue control program 300 utilizes the distances surrounding a vehicle, determined by device 130 of the vehicle, distance information determined by respective instances of device 130 within other vehicles within queue 120 and information within vehicle information 133 to determine whether sufficient distance is available to extract a vehicle from within a queue. In various scenarios, queue control program 300 also utilizes one or more constraints identified within a proximity of the vehicles within queue 120 to affect various determinations. In another scenario, queue control program 300 utilizes the distances surrounding a vehicle and information within vehicle information 133, such as a width corresponding to the vehicle and sizes related to accessories to determine whether sufficient distance is available for the vehicle to traverse through queue 120.

In one embodiment, responsive to determining that sufficient distance is not available to extract a vehicle from within a queue (No branch, decision step 303), queue control program 300 initiates wireless communication among one or more vehicles within the queue (step 304). In another embodiment, responsive to determining that sufficient distance is not available for a vehicle to traverse through queue 120 (No branch, decision step 303), queue control program 300 initiates wireless communication among one or more vehicles within the queue (step 304). In other embodiments, queue control program 300 determines that sufficient distance is not available to extract a vehicle from within a queue (No branch, decision step 303) based on receiving a command (e.g., an override indication) from a user of the vehicle via UI 136, that the user cannot extract an instance of vehicle 121 from within queue 120. For example, if a driver of vehicle 121B is experiencing a physical limitation, then the driver of vehicles 121B can override queue control program 300 determination that sufficient distance is available to extract from within a queue. In response, queue control program 300 initiates wireless communication among one or more vehicles within the queue (step 304).

In step 304, queue control program 300 initiates wireless communication among one or more vehicles within the queue. In various embodiments, queue control program 300 utilizes one or more capabilities of an instance of device 130 to initiate wireless communications (WCs) among one or more other instances of device 130 within respective instances of vehicle 121 of queue 120, such as device 130B included within vehicle 121B. In addition to initiating wireless communications among one or more vehicles within queue 120, queue control program 300 transmits (e.g., broadcasts) information, requests information, and/or issues commands to other instances of device 130 included within respective instances of vehicle 121 within queue 120.

In some embodiments, in response to initiating wireless communications among the plurality of instances of vehicle 121 within queue 120, queue control program 300 determines a set of instances of vehicle 121 that are participating in wireless communications, such as by monitoring acknowledgements or replies related to various communications. If an instance of vehicle 121 is not participating in wireless communications, then queue control program 300 flags the instance of vehicle 121 that is not participating in wireless communications as an "immovable vehicle," and as such the flagged vehicle is an obstacle-based constraint that affects various determinations. In one embodiment, queue control program 300 also transmits information associated with an instance of certificates 134 corresponding to the instance of vehicle 121 to enable one or more instances of queue control program 300 and/or vehicle control program 132 to securely interact.

In another embodiment, queue control program 300 initiates wireless communications among one or more instances of vehicle 121 (e.g., respective instances of device 130) within queue 120 within a range of the instance of vehicle 121 based on the strength of the wireless communication signal emitted by device 130. In another embodiment, one or more vehicles of queue 120 do not have sufficient wireless communication signal strength to communicate information (e.g., replies) beyond a threshold distance, such as one or two vehicle lengths. In response, instances of queue control program 300 and/or device 130 within respective instances of vehicle 121 relay (e.g., ripple communicate) information between vehicles within queue 120. For example, vehicle 121B has sufficient wireless communication signal strength to reach vehicle 121G but if vehicle 121G does not have sufficient wireless communication signal strength to respond to vehicle 121B directly, then vehicle 121G can relay information (e.g., replies) via one or more intermediate vehicles, such as vehicles 121F through vehicles 121C.

In step 306, queue control program 300 determines distances between adjacent vehicles within the queue. Queue control program 300 determines distance values or size values of space separating adjacent vehicles within queue 120 utilizing various aspects of device 130. In one embodiment, queue control program 300 utilizes one or more distances determined in step 302. In another embodiment, respective instances of queue control program 300, device 130, and one or more sensors of sensors 131 within other instances of vehicle 121 determines the distances between adjacent vehicles within the queue 120. In some embodiments, queue control program 300 determines the distance between adjacent vehicles based on accessories attached to one or more instances of vehicles 121. In some embodiments, instances of queue control program 300 within respective instances of vehicle 121 receive distance information wirelessly communicated and/or relayed among vehicles within queue 120.

In other embodiments, queue control program 300 determines the distance beyond (e.g., past) an instance of vehicle 121, such as the distance from one vehicle to an obstacle; from the vehicle to and/or across a restricted area; or from the vehicle to another constraint, such as a cross-street or open tailgate. In an example, utilizing information determined by device 130N of vehicle 121N, queue control program 300 receives, via WC 138N, the determined distance beyond vehicle 121N to a cross-street perpendicular to queue 120. In various embodiments, queue control program 300 generates a dynamic map of the distances among instances of vehicle 121 within queue 120. Queue control program 300 may update the dynamic map associated with queue 120 based on one or more constraints identified within step 308.

In step 308, queue control program 300 identifies constraints within a proximity of the vehicles within the queue. Queue control program 300 and/or vehicle control program 132 may continuously monitor for constraints related to safety within queue 120, such as movement between vehicles, a lowered tailgate, a driver entering another instance of vehicle 121, an added physical warning element (e.g., hazard cones), etc. In one embodiment, queue control program 300 identifies constraints associated within queue 120 based on a lack of wireless communication with an instance of vehicle 121 within queue 120 or based on information respectively associated with an instance of vehicle information 133 that indicates that the respective instance of vehicle 121 is not an automated vehicle. Therefore, queue control program 300 flags the identified vehicle with the constraint of "immovable vehicle." Queue control program 300 may also flag a vehicle within queue 120 with the constraint of "immovable vehicle" or "obstacle" in response to the instance of vehicle control program 132 indicating that the transmitted instance of certificates 134 is not accepted.

In some embodiments, queue control program 300 utilizes one or more of sensors of sensors 131 respectively associated with a vehicle within queue 120 to visually, acoustically, and/or positionally (e.g., GPS coordinates and a map function) identify constraints associated with queue 120. In one example, queue control program 300 identifies, either directly or via wireless communicated information, constraints within a proximity of queue 120, such as restricted areas, obstacles (e.g., such as utility poles, street signs, gates, fences, buildings, etc.), designated parking spaces, etc. In other embodiments, queue control program 300 identifies constraints associated within queue 120 based on respective instances of vehicle information 133, such as a turning radius of a vehicle, access points of a vehicle and clearance dictates corresponding to an access point (e.g., size of a door, direction and radius of the swing of the door, etc.), clearance effects of one or more accessories external to a vehicle, etc.

In step 310, queue control program 300 determines changes to positions of the vehicles within the queue. In some scenarios, queue control program 300 determines (e.g., calculates) changes to positions of the vehicles within the queue based on maximizing the space around the vehicle signaling to exit the queue, such as for a novice drive and/or during periods of increased traffic along the queue. In other scenarios, queue control program 300 determines changes to positions of the vehicles within the queue based on a minimum space dictated to extract the vehicle signaling to exit the queue, such as for an automated vehicle. In various scenarios, queue control program 300 determines changes to positions of the vehicles within the queue based on one or more constraints, such as accessories attached to the vehicle signaling to exit the queue, repositioning a minimum number of vehicles within queue 120, minimum safe distances between vehicles, locations of obstacles and/or restricted areas in proximity of the queue, etc.

In one embodiment, queue control program 300 determines changes to positions of one or more vehicles within queue 120 based on a threshold distance value (e.g., spacing) required to extract the vehicle that initiated queue control program 300 and the determined distances between and/or beyond other instances of vehicle 121 within queue 120, such as among the set of vehicles constrained by one or more "immovable vehicles" or other obstacles. In some embodiments, queue control program 300 determines changes to positions of one or more vehicles within queue 120 based on determined distance between and/or beyond other instances of vehicle 121 within queue 120, and further based on temporarily intruding on one or more restricted area.

Still referring to step 310, in an alternative embodiment, queue control program 300 determines changes to positions of one or more instances of vehicle 121 within queue 120 based on creating a space (e.g., gap distance) greater than a threshold size value for the instance of vehicle 121 external to queue 120 to enter and park within queue 120. In other embodiments, queue control program 300 determines changes to positions of one or more instances of vehicle 121 within queue 120 based on resetting or modifying (e.g., recalculating) the positions of various instances of vehicle 121 in response to an instance of vehicle 121: exiting queue 120, traversing queue 120, or parking within queue 120.

In step 312, queue control program 300 modifies a position of a vehicle within the queue. In an embodiment, queue control program 300 modifies the positions of one or more vehicles within queue 120 based on the determined changes of positions corresponding to one or more instances of vehicles 121 (step 310). In one embodiment, queue control program 300 modifies the positions of one or more instances of vehicles 121 within queue 120 based on transmitting wireless communications that include movement commands and position information to respective instances of vehicle control program 132 within instances of vehicle 121 required to increase the distances (e.g., space) surrounding a vehicle within queue 120, to extract the vehicle from queue 120. In another embodiment, queue control program 300 modifies the positions of one or more instances of vehicles 121 within queue 120 wirelessly relaying communications that include movement commands and position information to respective instances of vehicle control program 132.

In some embodiments, multiple instances of queue control program 300 within instance of vehicle 121 within queue 120 collaboratively interact to modify respective positions of one or more instances of vehicles 121 within queue 120. In an embodiment, and as a safety consideration, queue control program 300 also monitors the movements of the other vehicles within the queue commanded to change positions or awaits a "move completed" response from the vehicles commanded to move within the queue. A further safety dictate may require that queue control program 300 also determine that a status of "parked" is associated with each instance of vehicle 121 that changed position within queue 120.

In response to determining that the other instances of vehicle 121 within queue 120 have stopped moving, queue control program 300 utilizes UI 136 to indicated to the driver of the vehicle that it is safe to exit or traverse queue 120. Alternatively, in response to determining that the other instances of vehicle 121 within queue 120 have stopped moving, queue control program 300 utilizes UI 136 to indicated to the driver of the vehicle that it is safe to park within queue 120. In a further embodiment, queue control program 300 instructs vehicle control program 132 of an automated instance of vehicle 121 to automatically, exit queue 120, traverse queue 120, or park within queue 120.

In decision step 313, queue control program 300 determines whether to further modify the queue of vehicles. In one embodiment, queue control program 300 determines to further modify queue 120 based on the determined distances between the instances of vehicle 121 that remain within queue 120 based on information within the respective instance of vehicle information 133, such as the width of the vehicle and the turning radius of the vehicle and/or physical elements associated with an instance vehicle 121. For example, the effective turning radius of vehicle 121G with an attached trailer (not shown) is larger than the turning radius of either entity individually. In another embodiment, queue control program 300 determines to further modify queue 120 based on the determined distances between the instances of vehicle 121 that remain within queue 120 based on "parking in" an immovable vehicle.

In some embodiments, queue control program 300 determines to modify queue 120 based additional information associated the one or more constraints identified within a proximity of the vehicles within queue 120 (in step 308). In an example, queue control program 300 determines that a queue area constraint, such as an area around a fire hydrant (not shown) was violated to extract vehicle 121G (not shown) from queue 120. In response, queue control program 300 determines that vehicles 121E and 121F (not shown) are repositioned to clear the area around the fire hydrant. In another example, queue control program 300 determines, based on information within vehicle information 133L (not shown), that a vehicle access constraint was violated to extract vehicle 121J (not shown) from queue 120. Vehicle 121L (not shown) moved to a position by a street sign that blocks a door of vehicle 121L associated with an access ramp. In response, queue control program 300 determines that vehicle 121L is subsequently repositioned to unblock the door associated with the access ramp. In a further example, queue control program 300 determines to further modify queue 120 (e.g., recalculate one or more vehicle positions and instruct one or more vehicles to move) based on information determined by various instances of sensors 131 among respective instances of vehicle 121 within the queue, such as to identify the designated parking spaces along the street where queue 120 is located, and to reposition the instances of vehicles 121 within the designated parking spaces along the street.

In other embodiments, queue control program 300 determines not to further modify queue 120 based on information determined within steps 306, 308, and 310. For example, sufficient distance remains available between instances of vehicle 121 within queue 120 and no constraints were violated; therefore, queue control program 300 determines not to further modify queue 120.

In an embodiment, responsive to determining to further modify the queue of vehicles (Yes branch, decision step 313), queue control program 300 loops to step 302 to determine distances surrounding a vehicle within the queue of vehicles. In some embodiments, instances of queue control program 300 within respective instances of vehicle 121 that remain within queue 120 loop to step 302 to collaboratively determine respective distances surrounding the remaining instances of vehicle 121 within the queue 120. In other embodiments, instances of queue control program 300 within respective instances of vehicle 121 utilize the distance information between vehicles determined in step 306 and the determined changes to positions determined in step 310 and proceed via the Yes branch of decision step 313 to decision step 303 to determine whether sufficient distance is available to extract another vehicle from within queue 120. In a further embodiment, responsive to determining to further modify the queue of vehicles (Yes branch, decision step 313), instances of queue control program 300 within respective instances of vehicle 121 utilize information determined in steps 306, 308, and 310 and proceed to decision step 303 to determine whether sufficient distance is available to insert another vehicle within queue 120.

Responsive to determining not to further modify the queue of vehicles (No branch, decision step 313), one or more instances of queue control program 300 terminate. In various embodiments, in response to queue control program 300 terminating within an instance of vehicle 121, vehicle control program 132 completes a parking procedure corresponding to the instance of vehicle 121, such as applying an emergency brake, shutting down the powertrain, and quiescing various systems related to the respective instances of vehicle 121 and device 130.

Referring to decision step 303, in one embodiment, responsive to determining that sufficient distance is available to extract a vehicle from within the queue (Yes branch, decision step 303), one or more instances of queue control program 300 terminate. In one scenario, the instance of queue control program 300 included within the vehicle terminates in response to the vehicle exiting queue 120. In another scenario, in response to determining that there is sufficient space within queue 120 for one or more other vehicles that remain in queue to exit queue 120 in the future, one or more instances of queue control program 300 terminate within respective vehicles that remain in the queue. In another embodiment, responsive to determining that sufficient distance is available for a vehicle to traverse the queue (Yes branch, decision step 303), one or more instances of queue control program 300 terminate.

Figure 4:
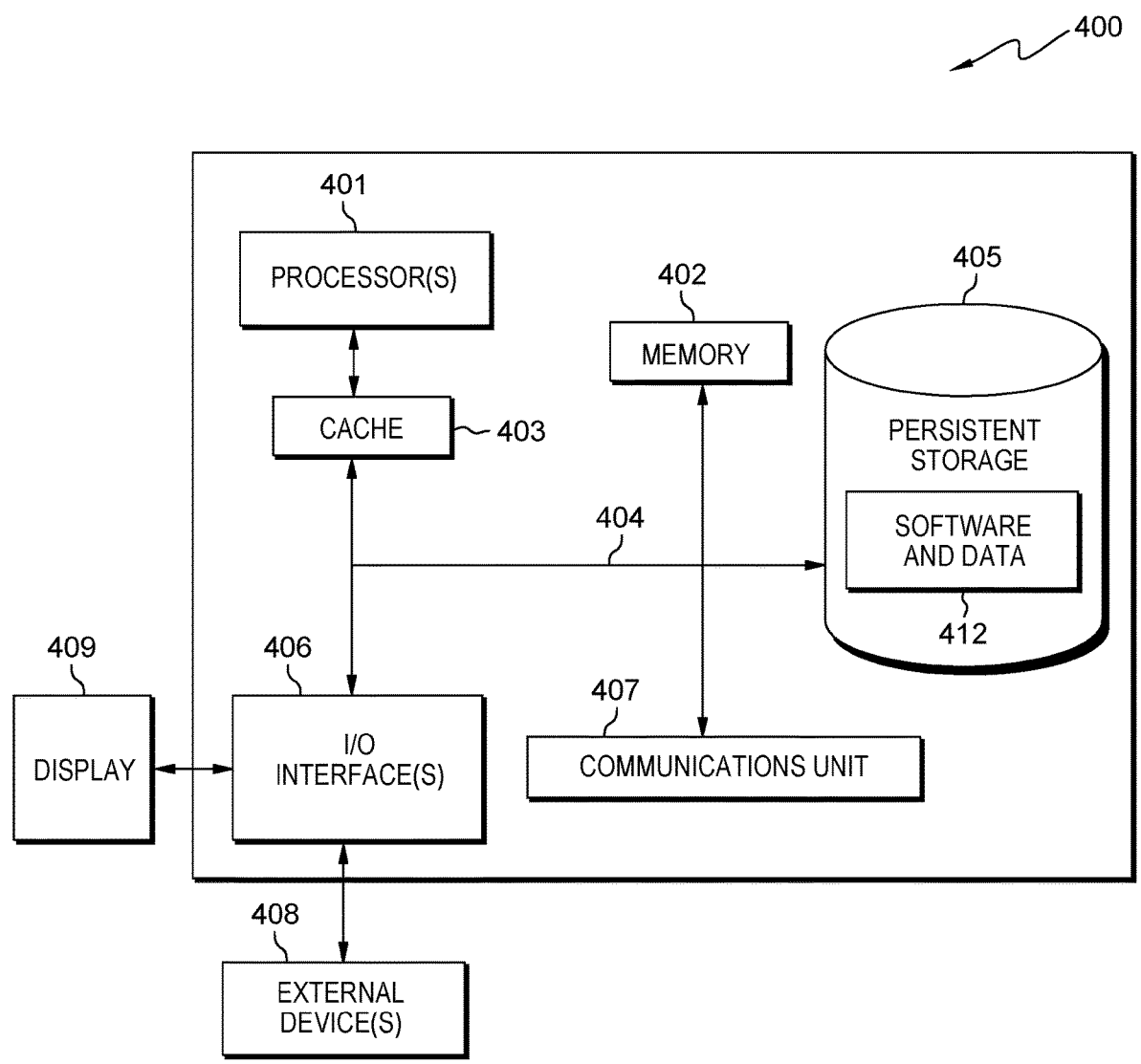
FIG. 4 is a block diagram of components of a computer system, in accordance with an embodiment of the present invention.

FIG. 4 depicts a block diagram of computer system 400, which is representative of system 102 and instances of device 130 associated with a respective instances of vehicle 121A through vehicle 121N (e.g., an onboard computer), and a mobile device of a user (not shown). Computer system 400 is an example of a system that includes software and data 412. Computer system 400 includes processor(s) 401, memory 402, cache 403, persistent storage 405, communications unit 407, input/output (I/O) interface(s) 406, and communications fabric 404. Communications fabric 404 provides communications between memory 402, cache 403, persistent storage 405, communications unit 407, and I/O interface(s) 406.

Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to system 102, software and data 412 includes: trusted use program 104 and certificate database 106, and various programs and data (not shown). With respect to device 130, software and data 412 includes: vehicle control program 132, queue control program 300, vehicle information 133, certificates 134, UI 136, and various programs and data (not shown).

Communications unit 407, in these examples, provides for communications with other data processing systems or devices (e.g., sensors), including resources of system 102, one or more of instance of device 130 respectively associated with one or more of vehicle 121A through vehicle 121N, and sensors 131 of a respective instance of device 130. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, a human machine interface, various sensors, and/or some other suitable input device including virtual devices. External device(s) 408 can also include portable computer readable storage media, such as, for example, thumb drives, portable optical or magnetic disks, and memory cards. Software and data 412 used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor. Display 409 can also function as a touch screen, such as the display of a tablet computer or a smartphone. Alternatively, display 409 displays information to a user based on a projection technology, such as virtual retinal display, a virtual display, or image projector.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additionally, the phrase "based on" should be interpreted to mean "based, at least in part, on."

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for modifying a queue of vehicles, the method comprising:
responsive to a driver of a first vehicle within a queue of vehicles initiating a queue control software application via a mobile device, determining, by one or more computer processors, a set of respective distance values between the first vehicle and one or more adjacent vehicles within the queue of vehicles;
determining, by one or more computer processors, a threshold distance value that corresponds to a distance required to extract the first vehicle from within the queue of vehicles;
responsive to determining the threshold distance value is not met to extract the first vehicle from within the queue of vehicles, initiating, by one or more computer processors, a first wireless communication among the one or more adjacent vehicles to determine participation of the one or more adjacent vehicles;
determining, by one or more computer processors, a change of position corresponding to at least one adjacent vehicle to the first vehicle based on the determined respective distance values, wherein the determined change of position moves the at least one adjacent vehicle to a distance value from the first vehicle that exceed the threshold distance value;

generating, by one or more computer processors, a dynamic map including a set of GPS coordinates of a location of the one or more adjacent vehicles and the determined respective distance values between the first vehicle and the at least one adjacent vehicle; and transmitting, by one or more computer processors, a second wireless communication to the at least one adjacent vehicle, requesting the at least one adjacent vehicle to remotely-activate and move to the determined change of position to extract the first vehicle from within the queue of vehicles.

2. The method of claim 1, wherein the one or more adjacent vehicles includes at least one automated vehicle.

3. The method of claim 1, wherein the queue of vehicles includes at least one other element beyond the one or more adjacent vehicles to the first vehicle, and wherein the at least one other element is selected from the group consisting of: an automated vehicle; an immovable obstacle; and a restricted area.

4. The method of claim 1, further comprising:
transmitting, by one or more computer processors, a request to a second vehicle within the queue of vehicles to provide information associated with respective distance values between the second vehicle and a third vehicle within the queue of vehicles;
receiving, by one or more computer processors, a response to the transmitted request; and
determining, by one or more processors, a distance value between the second vehicle and the third vehicle based on the received response.

5. The method of claim 1, further comprising:
determining, by one or more computer processors, that the queue of vehicles includes an immovable obstacle constraint;
determining, by one or more computer processors, a location of the immovable obstacle constraint within the queue of vehicles; and
recalculating, by one or more computer processors, the determined change of position corresponding to the at least one adjacent vehicle within the queue of vehicles based on the location of the immovable obstacle constraint within the queue of vehicles.

6. The method of claim 5, wherein the immovable obstacle constraint includes a manually-operated vehicle within the queue of vehicles.

7. The method of claim 1, further comprising:
determining, by one or more computer processors, that the queue of vehicles includes an associated restricted area;
determining, by one or more computer processors, a location and a size corresponding to the restricted area associated with the queue of vehicles; and
recalculating, by one or more computer processors, the determined change of position corresponding to the at least one adjacent vehicle within the queue of vehicles based on the location of the restricted area and the size of the restricted area.

8. A computer program product for modifying a queue of vehicles, the computer program product comprising:
one or more computer-readable tangible storage devices and program instructions stored on the one or more computer-readable tangible storage devices, the program instructions readable/executable by one or more computer processors and further comprising:
responsive to a driver of a first vehicle within a queue of vehicles initiating a queue control software application via a mobile device, program instructions to determine a set of respective distance values between the first vehicle and one or more adjacent vehicles within the queue of vehicles;
program instructions to determine a threshold distance value that corresponds to a distance required to extract the first vehicle from within the queue of vehicles;
responsive to determining the threshold distance value is not met to extract the first vehicle from within the queue of vehicles, program instructions to initiate a first wireless communication among the one or more adjacent vehicles to determine participation of the one or more adjacent vehicles;
program instructions to determine a change of position corresponding to at least one adjacent vehicle to the first vehicle based on the determined respective distance values, wherein the determined change of position moves the at least one adjacent vehicle to a distance value from the first vehicle that exceed the threshold distance value;
program instructions to generate a dynamic map including a set of GPS coordinates of a location of the one or more adjacent vehicles and the determined respective distance values between the first vehicle and the at least one adjacent vehicle; and
program instructions to transmit a second wireless communication to the at least one adjacent vehicle, requesting the at least one adjacent vehicle to remotely-activate and move to the determined change of position to extract the first vehicle from within the queue of vehicles.

9. The computer program product of claim 8, wherein the one or more adjacent vehicles includes at least one automated vehicle.

10. The computer program product of claim 8, wherein the queue of vehicles includes at least one other element beyond the one or more adjacent vehicles to the first vehicle, and wherein the at least one other element is selected from the group consisting of: an automated vehicle; an immovable obstacle; and a restricted area.

11. The computer program product of claim 8, further comprising:
program instructions to transmit a request to a second vehicle within the queue of vehicles to provide information associated with respective distance values between the second vehicle and a third vehicle within the queue of vehicles;
program instructions to receive a response to the transmitted request; and
program instructions to determine a distance value between the second vehicle and the third vehicle based on the received response.

12. The computer program product of claim 8, further comprising:
program instructions to determine that the queue of vehicles includes an immovable obstacle constraint;
program instructions to determine a location of the immovable obstacle constraint within the queue of vehicles; and
program instructions to recalculate the determined change of position corresponding to the at least one adjacent vehicle within the queue of vehicles based on the location of the immovable obstacle constraint within the queue of vehicles.

13. The computer program product of claim 12, wherein the immovable obstacle constraint includes a manually-operated vehicle within the queue of vehicles.

14. The computer program product of claim 8, further comprising:
   program instructions to determine that the queue of vehicles includes an associated restricted area;
   program instructions to determine a location and a size corresponding to the restricted area associated with the queue of vehicles; and
   program instructions to recalculate the determined change of position corresponding to the at least one adjacent vehicle within the queue of vehicles based on the location of the restricted area and the size of the restricted area.

15. A computer system for modifying a queue of vehicles, the computer system comprising:
   one or more computer processors;
   one or more computer-readable tangible storage device; and
   program instructions stored on the computer-readable tangible storage device for reading/execution by at least one of the one or more computer processors, the program instructions further comprising:
      responsive to a driver of a first vehicle within a queue of vehicles initiating a queue control software application via a mobile device, program instructions to determine a set of respective distance values between the first vehicle and one or more adjacent vehicles within the queue of vehicles;
      program instructions to determine a threshold distance value that corresponds to a distance required to extract the first vehicle from within the queue of vehicles;
      responsive to determining the threshold distance value is not met to extract the first vehicle from within the queue of vehicles, program instructions to initiate a first wireless communication among the one or more adjacent vehicles to determine participation of the one or more adjacent vehicles;
      program instructions to determine a change of position corresponding to at least one adjacent vehicle to the first vehicle based on the determined respective distance values, wherein the determined change of position moves the at least one adjacent vehicle to a distance value from the first vehicle that exceed the threshold distance value;
      program instructions to generate a dynamic map including a set of GPS coordinates of a location of the one or more adjacent vehicles and the determined respective distance values between the first vehicle and the at least one adjacent vehicle; and
      program instructions to transmit a second wireless communication to the at least one adjacent vehicle, requesting the at least one adjacent vehicle to remotely-activate and move to the determined change of position to extract the first vehicle from within the queue of vehicles.

16. The computer system of claim 15, wherein the one or more adjacent vehicles includes at least one automated vehicle.

17. The computer system of claim 15, wherein the queue of vehicles includes at least one other element beyond the one or more adjacent vehicles to the first vehicle, and wherein the at least one other element is selected from the group consisting of: an automated vehicle; an immovable obstacle; and a restricted area.

18. The computer system of claim 15, further comprising:
   program instructions to transmit a request to a second vehicle within the queue of vehicles to provide information associated with respective distance values between the second vehicle and a third vehicle within the queue of vehicles;
   program instructions to receive a response to the transmitted request; and
   program instructions to determine a distance value between the second vehicle and the third vehicle based on the received response.

19. The computer system of claim 15, further comprising:
   program instructions to determine that the queue of vehicles includes an immovable obstacle constraint;
   program instructions to determine a location of the immovable obstacle constraint within the queue of vehicles; and
   program instructions to recalculate the determined change of position corresponding to the at least one adjacent vehicle within the queue of vehicles based on the location of the immovable obstacle constraint within the queue of vehicles.

20. The computer system of claim 15, further comprising:
   program instructions to determine that the queue of vehicles includes an associated restricted area;
   program instructions to determine a location and a size corresponding to the restricted area associated with the queue of vehicles; and
   program instructions to recalculate the determined change of position corresponding to the at least one adjacent vehicle within the queue of vehicles based on the location of the restricted area and the size of the restricted area.

* * * * *